United States Patent Office 3,040,076
Patented June 19, 1962

3,040,076
PROCESS FOR THE MANUFACTURE OF COLORLESS OR ONLY SLIGHTLY COLORED ADDITION PRODUCTS OF ALKYLENE OXIDES
Willy Seidel, Burgkirchen an der Alz, and Wolfgang Knoblauch, Burghausen (Salzach), Germany, assignors to Farbwerke Hoechst Aktiengesellschaft vormals Meister Lucius & Brüning, Frankfurt am Main, Germany, a corporation of Germany
No Drawing. Filed May 28, 1959, Ser. No. 816,397
Claims priority, application Germany May 30, 1958
12 Claims. (Cl. 260—404)

In the manufacture of various addition products by the reaction of alkylene oxides with appropriate other compounds, especially such compounds as contain mobile hydrogen atoms, there often appears in a disturbing manner a more or less strong discoloration of the condensation products. This discoloration, which may range from a light yellow to a deep red brown, is in every case undesired and in many cases prohibits the processing or any other use of the products. Since most of the oxalkylation products do not possess an inherent color, the above-mentioned discolorations being thus caused by impurities, the colorless or only slightly colored products have under this point of view a much greater commercial value. Therefore, remarkable expenses have been made to obtain as colorless products as possible and, if necessary, also quite noticeable reductions in yield have been put up with. Hence, one has tried to use very purified reaction components or to repress the discoloration by a post-treatment with known lightening agents, e.g. activated charcoal and bleaching earth, or with bleaching agents, e.g. hydrogen peroxide. In spite of these attempts the brightening of the color was in many cases unsatisfactory and in some cases insufficient so that the oxalkylation products concerned could not be utilized up to now.

Now we have found that the undesired discoloration can be substantially reduced, in many cases even completely repressed, by providing in the various processes of oxalkylation with addition of alkaline catalysts the addition of slight amounts of oxidation inhibitors or reducing agents. Such reducing agents are suitable which do not have a disturbing color inherent therein and the oxidation products and alkylene oxide addition products of which are also colorless and do not separate out as insoluble precipitates. As such substances, there are, for example: bases of the nitrogen having a reducing action, such as hydrazine, hydroxylamine and the salts thereof, acids of the phosphorus having a reducing action, such as phosphorous acid, hypophosphorus acid ($H_3PO_2$) and the salts or esters thereof, and finally also other compounds having a preferably strong reducing action.

In most cases it is sufficient to add these additives in an amount of 0.1 percent by weight referred to the quantity of starting material used. But, depending on the nature of the oxalkylation process and the sensitivity to discoloration of the starting material used, respectively, it may be useful to add also higher amounts up to 0.5 percent or up to 2%. The effect of the additive varies gradually according to the character of the product to be oxalkylated. One and the same reducing agent thus has a qualitatively different effect, depending on whether an organic acid, an amine, an alcohol, or a phenol is reacted with an alkylene oxide.

If the starting substances have a neutral reaction as, e.g. glycols or fatty alcohols, it is advisable to preliminary determine by such experiment whether a reducing agent having an alkaline reaction or a reducing agent having an acid reaction behaves more favorably. If the starting material is acidic, e.g. a fatty acid, the use of an acid reducing agent is advantageous. With starting substances that have an alkaline reaction however, reducing agents that have an alkaline reaction are more effective.

An iodine scale is used for determining the degree of discoloration. The color value given indicates the number of mg. of iodine which, dissolved in 100 cc. of an aqueous potassium iodide solution of 10 percent strength, is necessary for reaching the same color.

The following examples serve to illustrate the invention but they are not intended to limit it thereto:

Example 1

In a vessel provided with a stirrer, made from stainless steel (V4A), there is prepared the addition product of stearic acid and 30 moles of ethylene oxide while using a stearic acid of the commercially used luxury quality having a color value of below 1. The ethylene oxide used is very pure and contains less than 0.01 percent of acetaldehyde. 9.3 kilograms of stearic acid, whose molecular weight according to the saponification number is 270 (hence 34.4 moles), are introduced in mixture with 127.5 grams of caustic potash solution of 50 percent strength (=63.8 grams KOH=1.14 moles). After displacement of the air by nitrogen, the water that originates from the potash lye and from the neutralization is sucked off at an elevated temperature and 50 liters of ethylene oxide in liquid form (=45.5 kilograms=1030 moles) are added at 150 to 155° C. at the rate of its consumption indicated by the pressure gauge of the vessel. The first 3.3 liters (=2 moles of ethylene oxide, referred to 1 mole of stearic acid) are added at a pressure of 2 kg./cm.², and the main quantity of oxide is added, after the reaction has set in more vividly, at a pressure of 1 kg./cm². The final product is obtained in a yellow color and has the color value 15 in molten state.

The above described process was repeated under the same conditions but in the presence of various additives having a reducing action. Additives that have an acid reaction are compensated by an additional amount of the equivalent amount of the KOH used as catalyst.

| Amount and nature of the additive | Molar amount of the additive: | Addition referred to stearic acid | Catalyst KOH, g. | Color value |
|---|---|---|---|---|
| (a) without additive | | | 63.8 | 15 |
| (b) 25 grams of hydrazine-hydrate of 80% strength. | 0.4 mole $N_2H_4.H_2O$ | 0.215% $N_2H_4.H_2O$ | 63.8 | 9 |
| (c) 25 grams of hypophosphorous acid of 50% strength. | 0.19 mole $H_3PO_2$. | 0.135% $H_3PO_2$ | 74.5 | 5 |
| (d) 92.5 grams of hypophosphorous acid of 50% strength. | 0.7 mole $H_3PO_2$. | 0.5% $H_3PO_2$ | 103 | 2 |
| (e) 25 grams of hydrazine-hydrate of 80% strength. | 0.4 mole $N_2H_4.H_2O$ | 0.5% hydrazine-hypophosphite | 63.8 | 2.5 |
| 53 grams of hypophosphorous acid of 50% strength. | $+H_3PO_2$ | | | |
| (f) 8 grams of hydrazine-hydrate of 80% strength. | 0.128 mole $N_2H_4.H_2O$ | 0.16% hydrazine-hypophosphite | 63.8 | 7 |
| 17 grams of hypophosphorous acid of 50% strength. | $+H_3PO_2$ | | | |

The practically colorless examples (d) and (e) in addition do not have the inconvenient odor of example (a).

Example 2

The reaction of triethanolamine with ethylene oxide can be considered as oxalkylation reaction that has a particular tendency to discoloration. 150 grams (=1 mole) of colorless triethanolamine (color value below 1) are introduced into a flask provided with a stirrer. The ethylene oxide is added in gaseous form and with a slight excess, and for so long a period until the increase in weight in the flask has reached the desired value. A purified ethylene oxide containing less than 0.01% of acetaldehyde is used to add 132 grams of ethylene oxide (=3 moles). At 80° C., the reaction leads after 3 hours to a brown colored product, triethanolamine +3 moles of ethylene oxide, having a color value of 90; at 60° C. after 6½ hours to a reddish yellow product having the color value of 15.

The experiment at 60° C. is repeated with various additives having a reducing action under otherwise equal conditions.

| Nature and amount of the additive | Molar amount of additive | Additive referred to triethanolamine | Iodine color value |
|---|---|---|---|
| without additive | | | 15. |
| 0.75 gram of hydroxyl-amine-chlorohydrate. | 0.0108 mole $NH_2OH.HCl$. | 0.5% $NH_2OH.$-HCl. | 5. |
| 1.5 grams of hydroxyl-amine-chlorohydrate. | 0.0216 mole $NH_2OH.HCl$. | 1.0% $NH_2OH.$-HCl. | 1. |
| 0.94 gram of hydrazine-hydrate of 80% strength. | 0.015 mole $N_2H_4.H_2O$. | 0.5% $N_2H_4.H_2O$ | below 1. |
| 2.28 grams of thio-urea | 0.03 mole $(NH_2)_2CS$. | 1.5% $(NH_2)_2CS$ | below 1. |
| 1.58 grams of Na-hyposulfite. | 0.015 mole $Na_2S_2O_4.2H_2O$. | 1.05% $Na_2S_2O_4.$-$2H_2O$. | a1. | a Determined after separation by filtration of the separated elementary sulfur.

*Example 3*

14.9 kilograms (=100 moles) of triethanolamine in a colorless quality (color value below 1) are introduced into an autoclave provided with a stirrer and made of stainless steel (V4A), and 75 grams of a hydrazine-hydrate solution of 24 percent strength are then added. This corresponds to 11.5 grams of $N_2H_4$ (=0.36 mole) or to 0.077 percent of $N_2H_4$ referred to the triethanolamine. After having thoroughly rinsed with nitrogen, 14.5 liters (=13.2 kilograms or 300 moles, respectively) of purified ethylene oxide having a content of aldehyde of less than 0.01% are dropped in in such a manner that a temperature of 75° C. and a pressure of not more than 1 kg./cm.² can be maintained. After 7 hours the reaction is terminated.

The reaction product, which constitutes a trioxethyl ether of the triethanolamine, is as colorless as the starting material and also has a color value below 1. When using the same quantities but without additive, there is obtained a deeply brown colored product having a color value of 150.

*Example 4*

To 1.5 kilograms (=5.34 mole) of the addition product of 3 moles of ethylene oxide to 1 mole of triethanolamine obtained according to the process described in Example 3, there are added in a small vessel provided with a stirrer 32 grams of hydrazine-hydrate of 24 percent strength. This corresponds to 7.7 grams (=0.154 mole) of anhydrous hydrazine-hydrate or 4.9 grams of hydrazine, and, referred to the starting material, 0.33 percent of $N_2H_4$. 7.0 liters of ethylene oxide (=6.36 kilograms or 145 moles) are added. The reaction is carried out in the same manner as in Example 3, at the same temperature of 75° C., but at a higher pressure, i.e. 1.5 to 2 kg./cm.². It is terminated after 6 hours and yields the addition product triethanolamine +30 moles of ethylene oxide. The final product, having the color value of 1, is almost as colorless as the starting material.

The same reaction but conducted without further addition of hydrazine yields a deeply brown colored product having the color value 300.

*Example 5*

To 50 grams (=0.185 mole) of colorless stearylamine having the color value of below 1 is added in a glass flask 0.2 gram of pulverized KOH as catalyst. Purified ethylene oxide in gaseous form whose content of aldehyde amounts to less than 0.01 percent, is then introduced at 140° C. for so long a time until the increase in weight has reached 81 grams (=1.85 mole), which requires 2 hours. The product, stearylamine +10 moles of ethylene oxide prepared in this way, has a brown color corresponding to the color value 80.

The experiment is repeated with an additive of 0.25 gram of hydrazinehydrate of 80 percent strength corresponding to 0.128 gram of $N_2H_4$ (=0.004 mole), hence 0.256 percent of $N_2H_4$ referred to the starting substance. There is obtained a final product which is substantially less discolored and has a color value of 20 only.

*Example 6*

Stearylamine is reacted with 10 moles of ethylene oxide in a vessel made of stainless steel (V4A) and having a capacity of 550 liters and being provided with a stirrer. There are introduced 40 kilograms (=148 moles) of stearyl amine having the color number 2, and to this amount there are added 2 litres of water and 100 grams of hydrazine-hydrate of 24 percent strength (=15.4 grams of $N_2H_4$=0.48 mole). This corresponds to 0.04 percent of $N_2H_4$ referred to the starting product. Thus, 71.5 liters of ethylene oxide (=65 kilograms=1480 moles) are reacted. The ethylene oxide is purified and has a content of acetaldehyde of less than 0.01 percent. After having completely displaced the air in the vessel by means of nitrogen, a slightly diminished pressure of 0.8 atmosphere is adjusted by suction, and the ethylene oxide is introduced at 65° C. and 1 kg./cm.² in the form of a liquid. The temperature is maintained constant by cooling, the pressure by control of the feed of ethylene oxide. After 10 hours of reaction until the ethylene oxide is completely reacted, there is obtained an almost water-clear product having the color value 2.

Under otherwise equal reaction conditions, there is obtained from the same starting materials but without addition of the reducing agent only a reddish yellow colored product having the color value 30 to 35.

*Example 7*

To 10 kilograms of an oleylamine having the color value 4 and a molecular weight of 270 (hence 37 moles), there are added in a vessel made from stainless steel (V4A) and holding 50 liters 417 grams of hydrazine-hydrate and 347 cc. of distilled water. This corresponds to 64 grams (=2 moles) $N_2H_4$ and 700 grams (=39 moles) $H_2O$, referred to the oleylamine 0.64 percent of $N_2H_4$ and 7 percent of $H_2O$. 35.8 liters (=32.6 kilograms=740 moles) of a purified ethylene oxide containing less than 0.01 percent of acetaldehyde are then caused to add on the product. For this reaction, the vessel is kept at a slightly reduced pressure of 0.7 atmosphere after having been rinsed with nitrogen, whereas the temperature of the jacket vessel is maintained at 65° C. by passing a large quantity of water. The ethylene oxide in liquid form is then fed in in such a manner that the pressure remains constant at 1 kg./cm.². In the first part of the reaction the temperature adjusts to 70° C. and falls in the third quarter of the reaction to almost 65° C. The last quarter of the reaction is terminated at a bath temperature of 70° C. and at about the same interior temperature. After 18 hours the reaction is terminated. There is obtained a light yellow product having the color value 7 and being constituted from oleylamine +20 moles of ethylene oxide, to which is admixed 1.5 percent of $H_2O$.

The same oxalkylation reaction but without addition of hydrazine, thus only in presence of 700 grams of water, yields a brown colored product having the color value 120.

*Example 8*

For the reaction of coconut oil amine with 20 moles of ethylene oxide, there are introduced 6.5 kilograms of coconut oil amine (=32.5 moles) with the addition of 270 grams of hydrazine hydrate of 24 percent strength (=41.5 grams $N_2H_4$+228.5 grams of $H_2O$) and further 285 cc. of $H_2O$, hence a total of 41.5 grams of $N_2H_4$ (=1.3 moles) and 513.5 grams of $H_2O$ (=28.5 moles). The oxalkylation reaction is carried out within 4 hours at 70° C. and a pressure of 1 atmosphere (gauge) at first with 15.7 liters of ethylene oxide (=14.3 kilograms=325 moles). The reaction is then discontinued, and half the amount of hydrazine-hydrate of 24 percent strength, hence 135 grams (=20.8 grams of $N_2H_4$ and 114.2 grams of $H_2O$), are added, and the reaction is then continued under otherwise equal reaction conditions by continuous supply of a further 15.7 liters of ethylene oxide which are completely reacted after a further 4 hours. The total addition of hydrazine (calculated as $N_2H_4$) amounts to 62.3 grams=0.96 percent referred to the starting material, or 0.174 percent referred to the final product. The addition of water amounts to 9.7 percent referred to the starting product; referred to the final product it amounts to 1.75 percent.

In the first reaction stage there is reached the color value 3.5, in the second 2.5. The final product is only slightly yellowish.

With the addition of 10 percent of $H_2O$ only, and without reducing agent being added, one obtains, without interruption of the reaction under otherwise equal reaction conditions, a product that has a color value of 100.

*Example 9*

100 grams of colorless polyethylene glycol 200 (=0.5 mole) having the iodine color value of below 1 are reacted at 120° C. after 0.15 gram of sodium methylate of 30 percent strength (corresponding to 0.019 gram of Na) have been added as catalyst and after the methanol in excess has been removed by suction from the glass flask, with 2.25 moles of unpurified ethylene oxide (content of acetaldehyde: 0.6 percent), which is fed in in gaseous form, while intensely stirring, so that a polyethylene glycol having an average molecular weight of 400 is formed. The product is obtained in a deeply brown color and has a color value of 600.

Under otherwise equal reaction conditions and from the same starting materials, there is obtained a substantially lighter polyglycol 400 having a color value of 50, when adding 0.2 gram of sodium hypophosphite ($NaH_2PO_2.H_2O$) before the oxethylation. This corresponds to 0.0019 mole and, referred to the starting material, 0.2 percent of reducing agent.

*Example 10*

2.5 kilograms of diethylene glycol (=23.6 moles) are introduced into an autoclave of stainless steel (V4A) holding 10 liters and being provided with a stirrer, and 5 grams of pulverized potassium hydroxide are added as catalyst. The vessel is then liberated from remaining traces of air by thorough scavenging with nitrogen, and evacuated. At a reaction temperature of 120° C. and at a pressure of 0.8 to 1 atmosphere (gauge) there are then added in the course of 8 hours 7.8 liters of unpurified ethylene oxide in liquid form (=7.1 kilograms=162 moles) having an acetaldehyde content of 0.6 percent and reacted after a further hour. The reaction product is a polyethylene glycol having an average molecular weight of 400. It has a brown color corresponding to the color value 120 and has a strong and disagreeable odor.

By repeating the experiment with an addition of 10 grams of hypophosphorous acid of 50 percent strength (=5 grams of $H_3PO_2$=0.076 mole)—hence with 0.2 percent of $H_3PO_2$ referred to the starting product—and in increasing the amount of catalyst by an equivalent amount to 9.25 grams of KOH, there is obtained a polyglycol which is only slightly yellowish and has the color value 4. The disagreeable odor is distinctly reduced.

*Example 11*

A low molecular weight polypropylene glycol is prepared from dipropylene glycol and propylene oxide in a vessel with stirrer holding 50 liters and made from stainless steel, using 10 kilograms of colorless dipropylene glycol (=75 moles), 500 grams of sodium methylate of 30 percent strength (=62.5 grams of Na=2.7 moles) and 12.7 kilograms (=220 moles) of propylene oxide, the propionaldehyde content of which amounts to 0.08 percent. Before beginning the reaction, the vessel is thoroughly scavenged with nitrogen and the methanol liberated from the methylate is removed at 120° C. by suction. In maintaining a reaction temperature of 130° C. and a pressure in the vessel of 0.8 to 1 atmosphere (gauge), the propylene oxide is added in 1½ hours and is completely reacted in 1¾ hours. There is obtained a polypropylene glycol having an average molecular weight of 300 and a yellow color corresponding to the color value 8.

The reaction is repeated in the presence of 20 grams of hydrazine hydrate of 80 percent strength, corresponding to 10.25 grams of $N_2H_4$ or 0.32 mole, referred to the starting material 0.1 percent. The polypropylene glycol is substantially less yellow and has a color value of 4.

By repeating the process in the same way but with the addition of 40 grams of hypophosphorous acid of 50 percent strength—there are 20 grams of $H_3PO_2$=0.3 mole, or 0.2 percent referred to the starting material—and by accordingly increasing the amount of sodium methylate by an equivalent quantity to 550 grams, there is likewise obtained a product which is brighter and has a color value of 6.

*Example 12*

In the same manner as described in Example 11, there is prepared a low molecular weight polybutylene glycol from colorless 1,3-butylene glycol having the iodine color value of below 1, and a mixture of butylene oxide. The butylene oxide consists of about 70 percent of α-butylene oxide and about 20 percent of β-butylene oxide, and contains 0.27 percent of butyraldehyde. In the reaction are used 5 kilograms of butylene glycol (=31 moles), 250 grams of sodium methylate of 30 percent strength (=31.8 grams of Na=1.35 mole), 12 kilograms of butylene oxide (=167 moles). The oxide is dropped in at 130° C. and at a pressure of 0.8 to 1 atmosphere (gauge) in the course of 4½ hours; it is completely reacted after a further 1½ hours. The polybutylene glycol that has formed has a reddish yellow color corresponding to the color value 25.

By adding to the butylene glycol, before the oxbutylation, 20 grams of hypophosphorous acid of 50 percent strength (=0.15 mole $H_3PO_2$)—corresponding to 0.2 percent referred to the starting material—and by increasing the amount of sodium methylate by an equivalent amount to 275 grams—there is obtained a final product which is substantially brighter and corresponds to the color value 15.

The final product can be obtained in a much brighter form by carrying out the reaction with the same reactants and under otherwise equal reaction conditions after addition of 10 grams of hydrazine hydrate of 80 percent strength, corresponding to 5.12 grams of $N_2H_4$ (=0.16 mole), referred to the starting material 0.1 percent. The color value of the end product is 10.

*Example 13*

150 kilograms of commercial tributylphenol (=595 moles) having a yellow color corresponding to the color value 20 are mixed, in an autoclave made from iron and provided with a stirrer, with 300 grams of $H_3PO_2$ of 50 percent strength (=2.3 moles), which corresponds to an addition of 0.1 percent of $H_3PO_2$. 540 grams of pulverized caustic potash (=9.6 grams of KOH) are then added as catalyst. The air is displaced by nitrogen. 324 kilograms of purified ethylene oxide (=7350 moles) in a liquid form are then added in the course of 7 hours while maintaining a temperature of 145° C. and a pressure of 2.5 kg./cm.² and are completely reacted after a further quarter hour. The reaction product, which constitutes an addition product of 12.4 moles of ethylene oxide to tributyl phenol, has the color value of 2.5.

The same reaction, but carried out without addition of a reducing agent, yields a more strongly colored product having a color value of 8.

Example 14

Oleic acid is reacted with 2 moles of ethylene oxide. The oleic acid used has a yellow color corresponding to the color value 10. The ethylene oxide used is purified and contains less than 0.01 percent of aldehyde. The oxyethylation is carried out at 160° C. in a glass flask and while otherwise proceeding in the manner descibed in Example 12. There are introduced 100 grams of oleic acid (=0.35 mole), containing 0.2 gram of dissolved sodium (=0.0087 mole) as catalyst. After 2 hours the increase in weight caused by the gaseous ethylene oxide fed into the flask and the excess of which is allowed to escape, amounts to 31 grams (=0.70 mole). The color has darkened to a color value of 65.

By adding 0.3 gram of $H_3PO_3$ (=0.00365 mole) as reducing agent and 0.0073 mole of Na in order to maintain equal the effective amount of catalyst, there is obtained a product that has the color value 12. This is almost the same color value as that of the oleic acid used.

Example 15

In oxypropylations of fatty acids, there also occur strong discolorations which may be repressed to a great extent. On a laboratory scale there are added to 100 grams of coconut oil acid, which is slightly yellow colored corresponding to the color value 6, 0.5 gram of pulverized KOH (=0.009 mole). The whole is heated in glass flask provided with a reflux condenser to 160° C., while stirring intensely, and 32 grams of propylene oxide (=0.55 mole) are dropped in at the rate of its consumption which may be observed at the reflux. The propylene oxide has an aldehyde content of 0.6 percent. After a reaction period of 5 hours, there is obtained a red-brown reaction product consisting of coconut oil acid + 1.1 mole of propylene oxide. The melt has the color value 100.

When repeating the experiment but in adding 0.2 gram of sodium hypophosphite (corresponding to 0.0019 mole of $NaH_2PO_2.H_2O$—hence 0.2 percent referred to the starting substance) before dropping in the propylene oxide, there is obtained a product which is discolored only to a color value of 17.

Example 16

For the manufacture of the addition product of oleyl-alcohol + 8 moles of ethylene oxide on a laboratory scale, one starts from a commercial oleyl alcohol having a light yellow color (color value 4) and from purified ethylene oxide containing less than 0.01 percent of acetaldehyde. Thus, 150 grams of oleyl alcohol (=0.58 mole) together with 0.8 gram of pulverized potassium hydroxide (=0.143 mole) are introduced into a glass flask, and the ethylene oxide is fed in in gaseous form at a reaction temperature of 140° C. in the course of 3 hours, while stirring intensely, until the increase in weight amounts to 204 grams (=4.64 moles of ethylene oxide). In molten state, the reaction product has a reddish-brown color corresponding to a color value of 45.

When repeating the experiment in order to improve the color by adding 0.3 gram of sodium hypophosphite (=0.0028 mole)—corresponding to 0.2 percent, referred to the starting material—before the oxethylation, there is obtained a product that has the color value of 15 only.

We claim:

1. In the process of reacting an organic compound containing at least one reactive hydrogen atom with an aliphatic alkylene oxide, the improvement which comprises adding to the reaction mixture a reducing agent of the group consisting of hydrazine, hydroxylamine, salts of said compounds, hydrazine hydrate, phosphorous acid, hypophosphorous acid, salts and esters of said acids, hyposulfite of soda and mixtures of these compounds in an amount of up to 2% by weight referred to the organic compound containing reactive hydrogen atom, wherein, when the compound containing hydrogen atom is acidic, an acid reducing agent is used and, when the compound is basic, a basic reducing agent is used.

2. In the process of reacting an organic compound containing at least one reactive hydrogen atom with an aliphatic alkylene oxide, the improvement which comprises adding to the reaction mixture a reducing agent of the group consisting of hydrazine, hydroxylamine, salts of said compounds, hydrazine hydrate, phosphorous acid, hypophosphorous acid, salts and esters of said acids, hyposulfite of soda and mixtures of these compounds in an amount of 0.1–0.5% by weight referred to the organic compound containing reactive hydrogen atom.

3. In the process of reacting an organic compound containing at least one reactive hydrogen atom with an alkylene oxide of the group consisting of ethylene oxide, propylene oxide, and butylene oxide, the improvement which comprises adding to the reaction mixture a reducing agent of the group consisting of hydrazine, hydroxylamine, salts of said compounds, hydrazine hydrate, phosphorous acid, hypophosphorous acid, salts and esters of said acids, hyposulfite of soda and mixtures of these compounds in an amount of up to 2% by weight referred to the organic compound containing reactive hydrogen atom.

4. In the process of reacting an organic compound containing at least one reactive hydrogen atom of the group consisting of amines, alcohols, phenols, and carboxylic acids with an alkylene oxide of the group consisting of ethylene oxide, propylene oxide, and butylene oxide, the improvement which comprises adding to the reaction mixture a reducing agent of the group consisting of hydrazine, hydroxylamine, salts of said compounds, hydrazine hydrate, phosphorous acid, hypophosphorous acid, salts and esters of said acids, hyposulfite of soda and mixtures of these compounds in an amount of up to 2% by weight referred to the organic compound containing reactive hydrogen atom.

5. A process step as claimed in claim 1, wherein hydrazine hydrate is used as reducing agent.

6. A process step as claimed in claim 1, wherein hypophosphorous acid is used as reducing agent.

7. A process step as claimed in claim 1, wherein phosphorous acid is used as reducing agent.

8. A process step as claimed in claim 1, wherein hydroxyl amine-chlorohydrate is used as reducing agent.

9. A process step as claimed in claim 1, wherein thiourea is used as reducing agent.

10. A process step as claimed in claim 1, wherein sodium hyposulfite is used as reducing agent.

11. The process step as claimed in claim 1, wherein a mixture of hypophosphorous acid and hydrazine hydrate is used as reducing agent.

12. The process step as claimed in claim 1, wherein the reducing agent is used in an amount of 0.1 to 1 percent referred to the organic compound used as starting substance.

References Cited in the file of this patent

Paquin: Epoxyd-Verbindungen und Epoxyhartze, Springer-Verlag, Berlin, Gottingen, Heidelberg (1958), pp. 23, 27, 28, 32, 44 and 46.